(12) United States Patent
Eklund

(10) Patent No.: US 11,524,723 B2
(45) Date of Patent: Dec. 13, 2022

(54) SUBFRAME FOR A VEHICLE

(71) Applicant: Volvo Car Corporation, Gothenburg (SE)

(72) Inventor: Johan Eklund, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 135 days.

(21) Appl. No.: 16/387,613

(22) Filed: Apr. 18, 2019

(65) Prior Publication Data

US 2019/0351947 A1 Nov. 21, 2019

(30) Foreign Application Priority Data

May 15, 2018 (EP) ..................................... 18172507

(51) Int. Cl.
*B62D 21/15* (2006.01)
*B62D 21/11* (2006.01)

(52) U.S. Cl.
CPC ............ *B62D 21/155* (2013.01); *B62D 21/11* (2013.01)

(58) Field of Classification Search
CPC ...... B62D 21/11; B62D 21/15; B62D 21/152; B62D 21/155; B62D 27/023; B62D 29/008
See application file for complete search history.

(56) References Cited

U.S. PATENT DOCUMENTS

| | | | | |
|---|---|---|---|---|
| 4,988,230 A | * | 1/1991 | Banthia | A47B 47/0008 403/170 |
| 5,320,403 A | * | 6/1994 | Kazyak | B62D 23/005 296/203.01 |
| 5,397,115 A | * | 3/1995 | Vlahovic | B60G 11/16 296/205 |
| 5,472,063 A | * | 12/1995 | Watanabe | F16F 1/02 180/274 |
| 5,536,035 A | * | 7/1996 | Bautz | B60G 3/20 280/124.139 |
| 5,692,798 A | | 12/1997 | Wehner et al. | |
| 5,735,068 A | * | 4/1998 | Houssian | A47G 1/10 40/784 |

(Continued)

FOREIGN PATENT DOCUMENTS

| | | |
|---|---|---|
| CN | 104925137 A | 9/2015 |
| CN | 105392690 A | 3/2016 |

(Continued)

OTHER PUBLICATIONS

Nov. 14, 2018 European Search Report issue on International Application No. EP18172507.

(Continued)

*Primary Examiner* — Frank B Vanaman
(74) *Attorney, Agent, or Firm* — Clements Bernard Walker; Christopher L. Bernard

(57) ABSTRACT

A subframe for a vehicle, which comprises a first and second longitudinal member, wherein the longitudinal members extend in a longitudinal direction (x) and are relatively offset in a transverse direction (y) of the subframe, a transverse front member connectable to the first and second longitudinal member at a front section of the subframe, a transverse rear member connectable to the first and second longitudinal member at a rear section of the subframe.

18 Claims, 5 Drawing Sheets

(56) References Cited

U.S. PATENT DOCUMENTS

| | | | | |
|---|---|---|---|---|
| 5,897,139 A * | 4/1999 | Aloe | ............. | B60G 7/02 |
| | | | | 280/781 |
| 6,367,869 B1 | 4/2002 | Baccouche et al. | | |
| 6,595,502 B2 * | 7/2003 | Koch | ............. | B60R 19/34 |
| | | | | 267/139 |
| 8,662,546 B2 * | 3/2014 | Kizaki | ............. | B60R 19/18 |
| | | | | 293/133 |
| 10,160,491 B2 | 12/2018 | Uicker et al. | | |
| 10,422,401 B2 * | 9/2019 | Gandhi | ............. | B60R 19/34 |
| 2003/0025359 A1 * | 2/2003 | Takahashi | ............. | B62D 21/155 |
| | | | | 296/203.02 |
| 2003/0030303 A1 * | 2/2003 | Panoz | ............. | B62D 23/005 |
| | | | | 296/204 |
| 2003/0080587 A1 * | 5/2003 | Kitagawa | ............. | B62D 21/155 |
| | | | | 296/187.09 |
| 2003/0094803 A1 * | 5/2003 | Fujiki | ............. | B62D 21/155 |
| | | | | 280/784 |
| 2004/0056469 A1 * | 3/2004 | Karaki | ............. | B60R 19/00 |
| | | | | 280/784 |
| 2005/0046237 A1 * | 3/2005 | Miyoshi | ............. | B62D 25/04 |
| | | | | 296/203.02 |
| 2005/0236827 A1 * | 10/2005 | Mouch | ............. | B62D 21/11 |
| | | | | 280/788 |
| 2006/0220405 A1 * | 10/2006 | Ohe | ............. | B60R 16/04 |
| | | | | 296/37.1 |
| 2007/0215402 A1 * | 9/2007 | Sasaki | ............. | B62D 25/088 |
| | | | | 180/232 |
| 2009/0236166 A1 * | 9/2009 | Kowaki | ............. | B62D 21/152 |
| | | | | 180/232 |
| 2015/0076847 A1 * | 3/2015 | Mori | ............. | B60R 19/18 |
| | | | | 293/154 |
| 2015/0266511 A1 | 9/2015 | Uicker et al. | | |
| 2015/0298741 A1 | 10/2015 | Winberg et al. | | |

FOREIGN PATENT DOCUMENTS

| | | |
|---|---|---|
| CN | 106945725 A | 7/2017 |
| CN | 107054467 A | 8/2017 |
| EP | 2786920 A1 | 10/2014 |
| FR | 3046590 A1 | 7/2017 |
| JP | 2000177621 A | 6/2000 |
| JP | 2002337724 A | 11/2002 |

OTHER PUBLICATIONS

First office action and search report issued in the corresponding CN application No. 201910378922.9.

Second office action and search report issued in the corresponding CN application No. 201910378922.9.

* cited by examiner

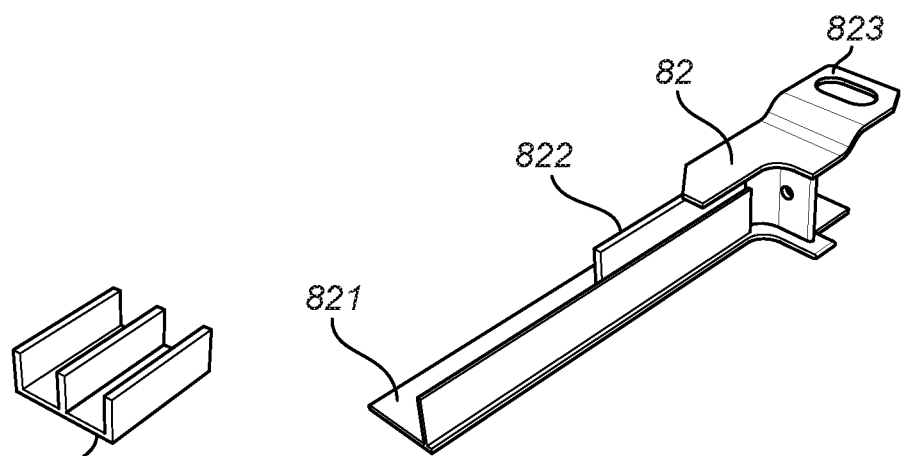
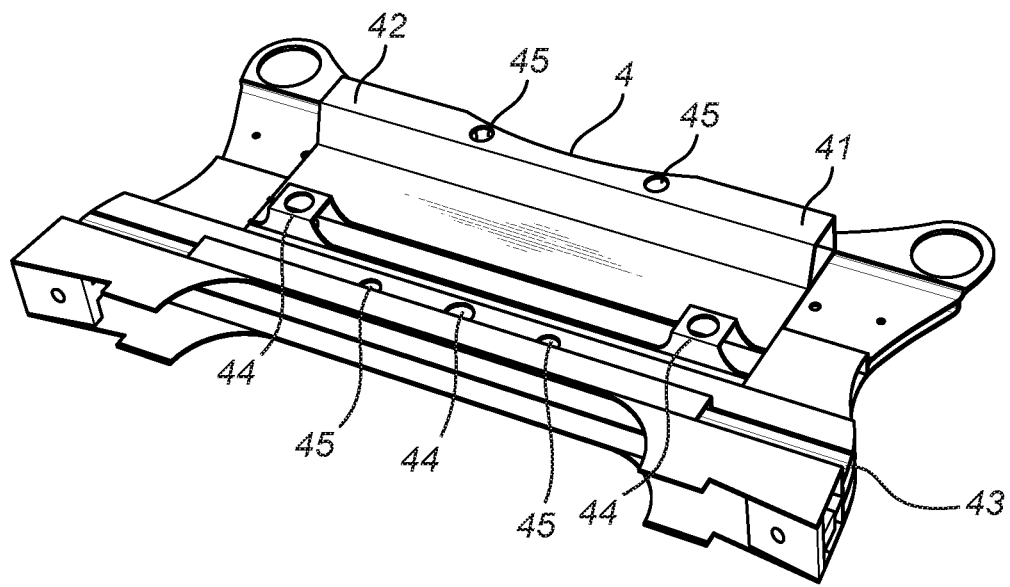
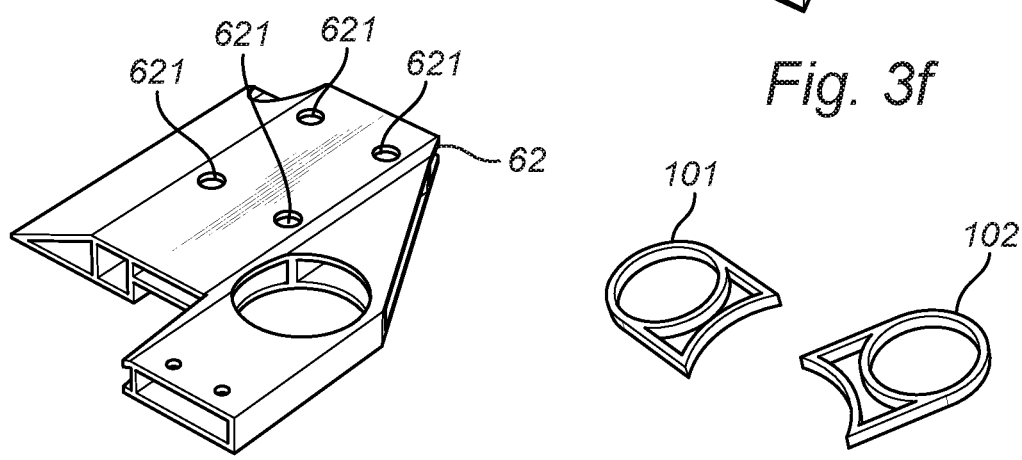
Fig. 3d   Fig. 3e
Fig. 3f
Fig. 3g   Fig. 3h

SUBFRAME FOR A VEHICLE

CROSS-REFERENCE TO RELATED APPLICATION

The present disclosure claims the benefit of priority of co-pending European Patent Application No. 18172507.8, filed on May 15, 2018, and entitled "SUBFRAME FOR A VEHICLE," the contents of which are incorporated in full by reference herein for all purposes.

TECHNICAL FIELD

The present disclosure relates to a subframe for a vehicle and to a method for manufacturing a subframe.

BACKGROUND

A subframe, which is connectable to vehicle bodies, such as passenger car bodies, is a well-known automotive component. Commonly a subframe is made by connecting different parts to thereby form a subframe structure, which may be square formed and enclose an opening. The subframe may carry different parts of the vehicle, such as an internal combustion engine.

Due to the rapid development pace in the automotive industry, where pure electrical and hybrid vehicles are becoming more common, new design needs and requirements arise. For example, reduction of weight of the different parts in the vehicle is important. However, weight reduction must not compromise with the strict safety requirements.

One example of a known subframe may be found in US 2015/0298741 A1, which discloses a subframe built by different parts, where some are extruded parts and the corner nodes are casted parts.

SUMMARY

In view of the above, an object of the present invention is to provide an improved subframe and method for manufacturing a subframe. More particularly, an object is to provide an improved subframe which is light in weight, provides high safety for the vehicle occupants and which also is cost-efficient.

The object is provided by the subject matter as defined in the independent claims. Advantageous embodiments may be found in the dependent claims and in the accompanying description and drawings.

According to a first aspect, the object is provided by a subframe for a vehicle, which comprises a first and second longitudinal member, wherein the longitudinal members extend in a longitudinal direction and are relatively offset in a transverse direction of the subframe. Moreover, a transverse front member is connectable to the first and second longitudinal member at a front section of the subframe, wherein the subframe further comprises a transverse rear member connectable to the first and second longitudinal member at a rear section of the subframe, wherein the transverse front member and the transverse rear member are relatively offset in a longitudinal direction of the subframe. The respective first and second longitudinal member and the respective transverse front and rear member are extruded profiles, whereby the extrusion of each respective longitudinal member extends substantially in the longitudinal direction and the extrusion of each respective transverse front and rear member extends substantially in the transverse direction. Moreover, the subframe further comprises a first and a second node which are connectable to the transverse rear member at opposite transverse end sections thereof, wherein the first and second nodes are extruded profiles.

By the provision of the present disclosure, an improved subframe is provided which is light in weight, cost-efficient and also provides high safety for vehicle occupants. It has namely been realized that the subframe may be made by extruded parts, including the rear nodes of the subframe. Previously, such nodes, which are crucial parts of such type of subframe, i.e. square-shaped subframes with an internal opening, have been made by e.g. casting. The reason for this is for example that casting has been regarded as the only way of accomplishing a rigid node with a complex shape which is necessary for connecting the other linking parts of the subframe. Furthermore, by the provision of the subframe as disclosed herein, a high crash performance may be accomplished, i.e. the subframe is designed to be able to handle a vehicle crash in an improved manner due to the design of the different parts thereof.

In this document, different directions are referred to, i.e. longitudinal, transverse and vertical with respect to the subframe. Unless explicitly stated otherwise, these directions refer to directions of the subframe when mounted into a vehicle. In other words, a longitudinal direction refers to a longitudinal direction of the vehicle, i.e. a direction in which the vehicle is intended to travel. The vertical direction refers to a vertical direction of the vehicle. The transverse direction is a direction which is perpendicular to the longitudinal direction and also to the vertical direction of the vehicle. Still further, extrusion as used herein is a well-known production method. For example, extrusion may be defined as a process used to create objects of a fixed cross-sectional profile. In the extrusion process, a material, such as aluminium, may be pushed through a die of a desired cross-section.

Optionally, the extrusion of the first and second respective node may extend in a substantially vertical direction of the subframe. It has namely further been realized that extruding the nodes in this direction is advantageous since it facilitates and increases the possibilities to connect the nodes to the transverse rear member in a rigid manner, thereby also providing a good crash performance.

Optionally, the subframe may further comprise a third and a fourth node which are connectable to the transverse front member at opposite transverse end sections thereof and/or to the first and second respective longitudinal member at the front section of the subframe. Moreover, the third and fourth node may also be extruded profiles. By also providing front nodes as extruded profiles, a further improved subframe may be provided, resulting in a cost-efficient, light weight and safe design. Still optionally, the extrusion of the third and fourth respective node may extend in the substantially longitudinal direction or in the substantially vertical direction of the subframe. These extrusion directions have also been found to be advantageous in order to provide a rigid connection to the transverse front member and/or to the first and second longitudinal members.

Optionally, the transverse front member may be configured as a pole absorbing member for absorbing longitudinal shock loads, wherein the pole absorbing member comprises at least one inner vertical wall which extends in the transverse direction. Still optionally, the pole absorbing member may comprise at least two inner vertical walls which extend in the transverse direction and which are relatively offset in the longitudinal direction. By integrating a pole absorbing member like this into the subframe, an improved safety may be provided. Additionally, fewer parts may be needed since the transverse front member is also configured as a pole absorbing member. In prior art designs, pole absorbing members have been placed in other locations and not been integrated into the subframe structure.

Optionally, at least one of the first and second node may comprise a vertical wall which extends in at least one of the longitudinal and transverse direction, wherein the vertical wall is configured for being connectable to the transverse rear member. Still optionally, the vertical wall extends in the transverse and in the longitudinal direction, wherein the vertical wall forms an essentially L-shaped profile which is connectable to and configured for enclosing a corner section of the transverse rear member. By providing a vertical wall like this, an improved and rigid connection is possible to accomplish. Additionally, by this configuration of the vertical wall, an increased surface area can be obtained, which is beneficial for improving the connection to the transverse rear member. For example, such design may be beneficial if the respective members are joined by welding.

Optionally, at least one of the first and second longitudinal member and the transverse rear member may comprise at least one trigger configured for folding the subframe during a collision. Still optionally, the at least one trigger may be located on an upper section of at least one of the first and second longitudinal member and the transverse rear member. Thereby the subframe, during a collision impact, may be folded such that the subframe attains essentially a U-shape, which has been found to be advantageous for safety reasons. Still optionally, at least one trigger may be located on an upper side of the transverse rear member and may extend in the transverse direction thereof. For example, such a trigger may be an integrated portion of the transverse rear member and be formed by the extrusion process of the transverse rear member. Still further, the at least one trigger may be configured as an indentation, such as a recess or the like on any one of the aforementioned members.

Optionally, at least one of the extruded profiles may be made of metal or metal alloy, preferably a light metal, and more preferably aluminium, such as high strength aluminium. By the provision of the design as disclosed herein, and by extruding at least one of the members preferably in aluminium, a high strength, ductile, non-brittle subframe may be provided, which also provides a high crash performance.

Optionally, at least one of the nodes may be connected to its respective transverse front or rear member and/or to the first and second respective longitudinal member by a weld.

Optionally, the subframe may be connectable to a vehicle body. Still optionally, the subframe may be connectable to a battery frame comprising at least one battery. Such battery may for example be intended for powering an electric propulsion motor of the vehicle. Still optionally, the subframe may be connectable to a battery charger, such as an induction charger. Just as a matter of example, an induction charger may be connectable to the transverse rear member, for example underneath the transverse rear member such that it may be easily charged by an external charger. Due to the subframe as disclosed herein, the transverse rear member may be easily adapted for being connectable to battery chargers of different sizes and shapes. This is mainly accomplished by the fact that the members are extruded.

Optionally, at least one of the nodes may comprise connecting means for connecting the subframe to the vehicle or to other components in the vehicle, such as an electric propulsion motor, an internal combustion engine, a vehicle corner module comprising a wheel suspension and a steering gear. It has namely been found that it may be advantageous to connect the subframe to the vehicle body or other parts thereof via the extruded nodes. Still optionally, the steering gear may be connectable to the transverse rear member.

Optionally, at least one of the extruded profiles may be configured as a hollow profile, which in turn may comprise at least one internal reinforcing wall. Preferably, most of the extruded parts, such as at least 90% of the extruded parts of the subframe, may be hollow profile parts. Still optionally, at least some of the parts may be open extruded profiles.

Optionally, the transverse rear member comprises at least two separate members which have been joined together along the transverse direction. These members may also be extruded parts whereby the extrusions extend in the transverse direction. The parts may together form the transverse rear member and be joined by for example welding.

According to a second aspect, the object is provided by a vehicle which comprises a subframe according to any one the embodiments of the first aspect of the invention. It shall be noted that all embodiments of the first aspect of the invention are applicable to the embodiments of the second aspect of the invention and vice versa. The advantages of the second aspect of the invention are largely analogous to the advantages of the first aspect of the invention and therefore they may not be further elaborated upon in respect of the second aspect.

Optionally, the vehicle may be any one of a road vehicle and a passenger car. Still optionally, the vehicle may be an electric car, such as a pure electric car or a hybrid car comprising an electric motor and internal combustion engine for propelling the vehicle.

According to a third aspect, the object is achieved by a method for manufacturing a subframe according to the first aspect, wherein the method comprises a step of extruding at least one of the transverse front member, the transverse rear member and the first and second longitudinal member, and further a step of extruding at least one of the first and second node and the third and fourth node.

BRIEF DESCRIPTION OF DRAWINGS

Exemplifying and preferred embodiments of the present invention will now be described more in detail, with reference to the accompanying drawings, wherein:

FIGS. 3a-h show the different components of the subframe as shown in FIG. 1 with FIG. 3a showing the transverse front member configured as a pole absorbing member, FIG. 3b showing the second longitudinal member with an upper trigger, FIG. 3c showing the second node, FIG. 3d showing the front connection member, FIG. 3e showing the second console or linkarm, FIG. 3f showing the transverse rear member, FIG. 3g showing the fourth node, and FIG. 3h showing the members used as reference hole consoles for aligning the subframe to a vehicle body;

Figure 1:
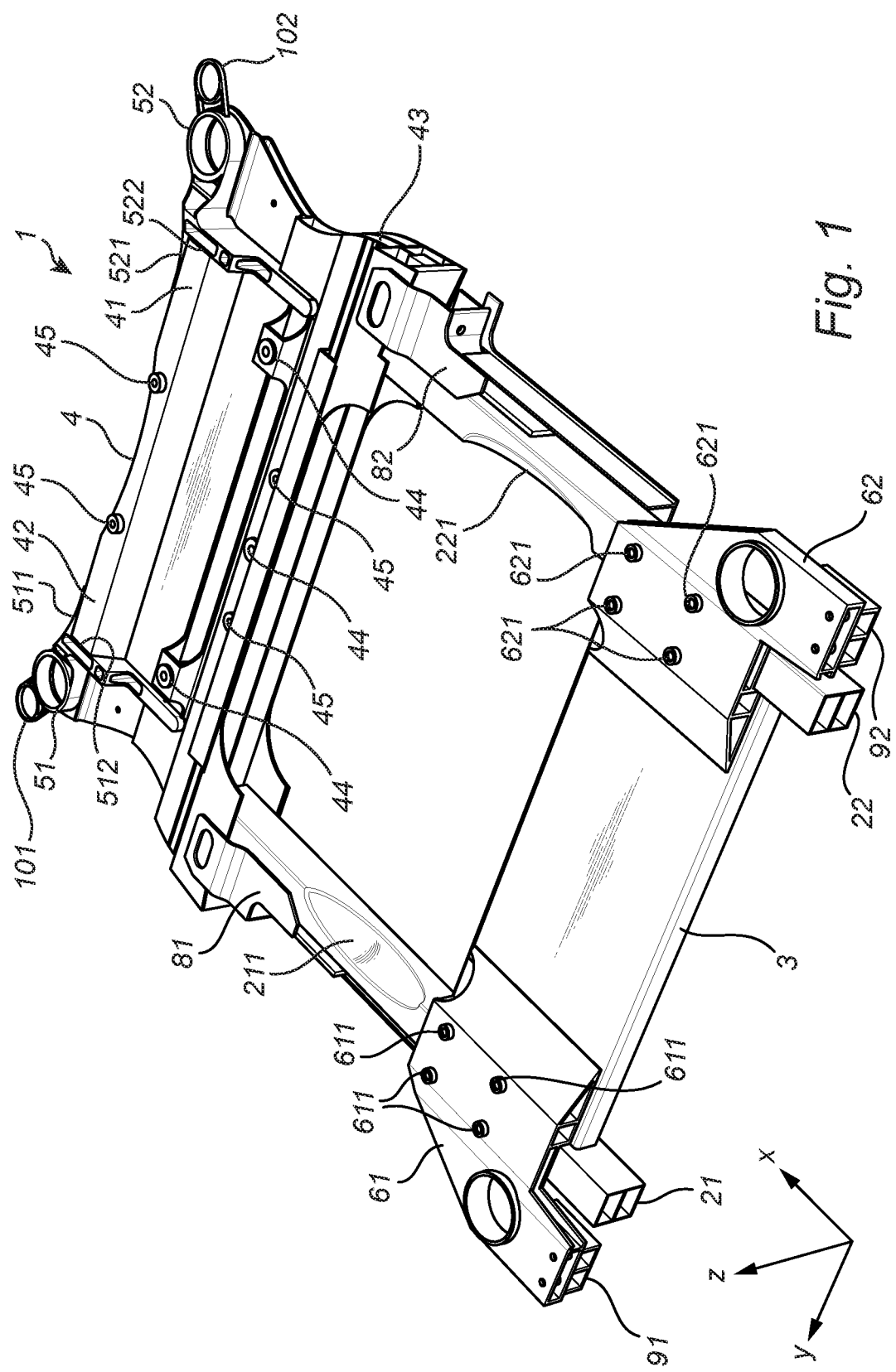
FIG. 1 shows a subframe according to an example embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DESCRIPTION OF EMBODIMENTS

In FIG. 1, a subframe 1 for a vehicle according to an example embodiment of the present invention is depicted. The subframe 1 comprises a first 21 and second 22 longitudinal member, wherein the longitudinal members 21 and 22 extend in a longitudinal direction x and are relatively offset in a transverse direction y of the subframe 1. Moreover, the subframe 1 comprises a transverse front member 3 connectable to the first and second longitudinal member 21 and 22 at a front section of the subframe 1, and a transverse rear member 4 connectable to the first and second longitudinal member 21 and 22 at a rear section of the subframe 1, wherein the transverse front member 3 and the transverse rear member 4 are relatively offset in a longitudinal direction x of the subframe 1. Still further, the respective first and second longitudinal members 21 and 22, and the respective transverse front and rear members 3 and 4 are extruded profiles, whereby the extrusion of each respective longitudinal member 21 and 22 extends substantially in the longitudinal direction x and the extrusion of each respective transverse front and rear members 3 and 4 extends substantially in the transverse direction y. The subframe 1 further comprises a first 51 and a second 52 node connectable to the transverse rear member 4 at opposite transverse end sections thereof, wherein the first and second nodes 51 and 52 are extruded profiles. The extrusion of the first and second nodes 51 and 52 extends substantially in the vertical direction z.

Moreover, in this example embodiment, the subframe 1 further comprises a third 61 and a fourth 62 node which are connectable to the transverse front member 3 at opposite transverse end sections thereof and to the first and second respective longitudinal members 21 and 22 at the front section of the subframe 1, wherein the third 61 and fourth 62 node also are extruded profiles. In this example, the extrusions of these nodes 61 and 62 extend substantially in the longitudinal direction x.

In addition to the above mentioned members, the subframe 1 in this example embodiment further comprises a first and a second extruded console, 81 and 82, respectively, for rigidly connecting the longitudinal members 21 and 22 to the transverse rear member 4. The consoles 81 and 82 are made of several components as will be further shown in FIG. 3e. In an embodiment, the respective consoles 81 and 82 may be denoted as linkarms.

Furthermore, the subframe 1 in this example embodiment further comprises a first and a second front connection member, 91 and 92, respectively. These members may for example be used for connecting an additional crash absorbing member (not shown) to the subframe 1. Still further, the subframe 1 as shown in FIG. 1 also comprises a first 101 and a second 102 connection members, also denoted as X & X, Y reference hole consoles, for aligning the subframe 1 to another object, such as the vehicle body or any other part of the vehicle. These members, 101 and 102, respectively, may also be extruded, and as can be seen in this embodiment, the extrusions may advantageously be made in the same direction as the nodes 51 and 52, i.e. in the vertical direction z.

Still further, in this embodiment, the subframe 1 comprises a number of triggers; 211, 221 and 43. The triggers 211 and 221 are located on the upper side of the respective longitudinal members 21 and 22. As can be seen in this embodiment, these two triggers are configured as indentations or recesses, and may for example be made by a pressing operation after the extrusion. The third trigger 43 is located on the upper side of the transverse rear member 4, and is made in the extrusion step. It shall be noted that this trigger also for example could be made in a similar operation as the other triggers 211, 221. However, generating the trigger 43 in the extrusion step has been found to be cost-efficient and also provides a trigger shape which is advantageous for allowing a predicted folding of the subframe 1 during a collision. Providing the triggers 211, 221 and 43 as in FIG. 1, has shown to be very good for generating a certain folding of the subframe 1 during a collision impact. More particularly, the subframe 1 will due to this configuration during a collision impact bend downwardly and fold into an essentially U-shaped form. In addition, by using a ductile metal for most of the components of the subframe 1, preferably aluminium or high strength aluminium, the subframe 1 may not crack even during high impact loads, such as peak loads of e.g. 200 kN. For more details of the preferred folding shape of the subframe 1 after a collision, see FIG. 4.

The subframe 1 further comprises a plurality of connection points, i.e. the connections 611, 621, 44 and 45. Said connection points may for example be used for connecting certain vehicle components to the subframe 1, such as an electric propulsion motor, a steering gear, vehicle suspension etc. (not shown). For example, an electrical propulsion motor (not shown) may be connected to the connections 611, 621 and 45, and a steering gear to the connections 44. The connections may be provided as bores, threaded bores or any other suitable connection means. Sleeves may be received in the bores and used for connecting the subframe 1 to the other parts. As can be seen, on the third node 61 are four connections 611 located on its upper side, and correspondingly, on the fourth node 62 are four connections 621 located.

Figure 3A:
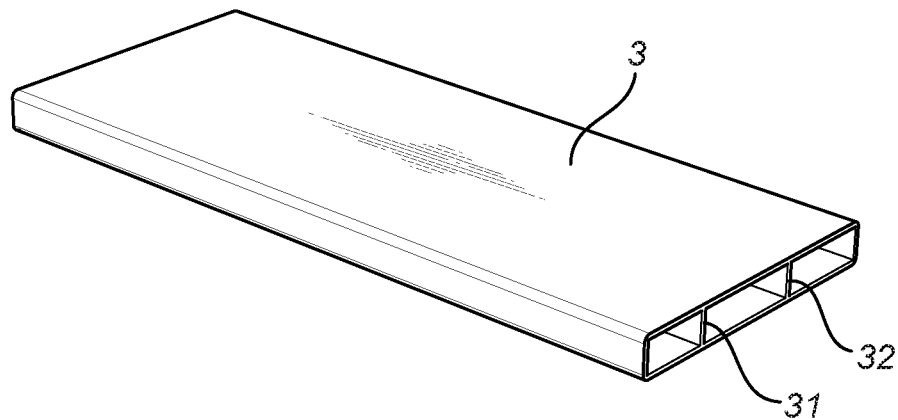

The transverse front member 3 is further in this example embodiment configured as a pole absorbing member for absorbing longitudinal shock loads. The member 3 is for example designed with a larger width in the longitudinal extension x than the other members and also presents a specific inner geometry as can be seen in FIG. 3a. By integrating the pole absorbing member 3 into the subframe 1, an improved safety may be provided in a cost efficient manner.

Figure 2:
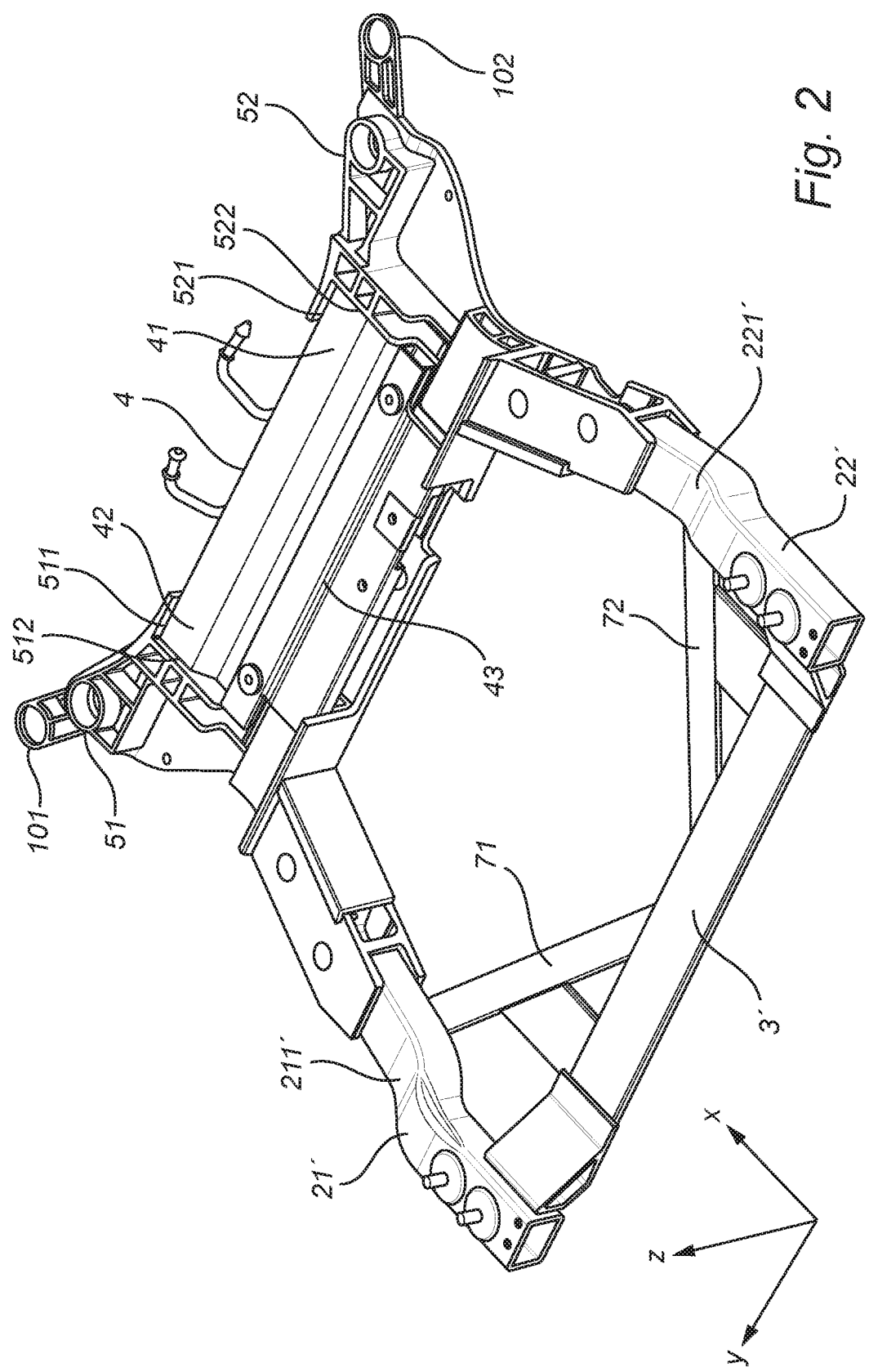
FIG. 2 shows another subframe according to an example embodiment of the present invention.

Now turning to FIG. 2, another example embodiment of a subframe 1 according to the present invention is depicted. The transverse rear member 4 and its related components are similar in configuration as the corresponding members shown in FIG. 1 and will therefore not be further detailed here. The subframe 1 in FIG. 2 differs in design by especially the longitudinal members 21' and 22', and also by the transverse front member 3'. The longitudinal members 21' and 22' are extruded and the extrusions extend in the longitudinal direction x. Thereafter the members 21' and 22' have been shaped to attain a somewhat curved profile with triggers 211' and 221' on the respective members 21' and 22'. Hence, the triggers 211' and 221' have been made by providing the curved profile such that the respective members 21' and 22' will fold downwardly during a collision. The transverse front member 3' is here designed with a smaller width in the longitudinal direction x. The subframe 1 is in this example embodiment also designed with extra reinforcing members 71 and 72 which are positioned between the respective longitudinal members 21' and 22' and the transverse front member 3'. The subframe 1 as shown in FIG. 2 may for example be used for a vehicle equipped with an internal combustion engine, which for example may be located just above the subframe 1 and also be connected to the subframe 1. In the case when the vehicle comprises an internal combustion engine, it may not be needed to use a pole absorbing member 3 as depicted in FIG. 1, and therefore the member 3' in FIG. 2 may not be configured as a pole absorbing member.

In FIGS. 3a-h, the separate components of the subframe 1 in FIG. 1 and partly the components as shown in FIG. 2 are depicted. FIG. 3a shows the transverse front member 3 configured as a pole absorbing member, wherein the member 3 comprises an extruded profile which extends in the transverse direction y, and further in this embodiment comprises two vertical walls 31 and 32 which are relatively offset in the longitudinal extension x and extend in the transverse direction y. By this configuration, the front pole absorbing member 3 will be able to accommodate a large impact load in the longitudinal direction x of the subframe 1. The pole absorbing member 3 may be configured with one, two or even more vertical walls. By optimizing the number of walls, the member may be able to absorb large impact loads. It has been realized that providing two such vertical walls is a preferred embodiment for the pole absorbing member 3.

Figure 3B:
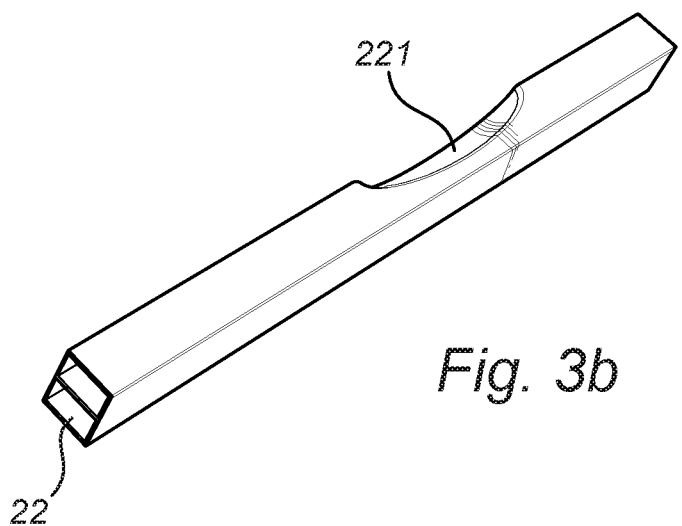

FIG. 3b shows the second longitudinal member 22 with an upper trigger 221 as also shown in FIG. 1. The trigger 221 is here configured as a recess on the upper side of the member 22 and extends a distance in the longitudinal direction x. The extension of the recess 221 in the longitudinal direction x may be longer than what is seen in the figure but it may also be shorter than what now is illustrated. The importance is to accomplish a function such that the member 22 will deform and fold downwardly when a large impact load is acting on the member 22 in the longitudinal direction x. The skilled person will realize that this function of the member 22 may be accomplished in several different ways, by e.g. different types of recesses, indentations or the like on the upper side thereof. To further increase the strength of the extruded member 22, it has in this example embodiment further been equipped with an intermediate wall that extends in the longitudinal extension x. Therefore, in an embodiment, at least one of the first and second longitudinal members comprises one or more intermediate walls extending in the longitudinal direction x and are located inside the member. It shall be noted that the first longitudinal member 21 may be configured in a corresponding manner as the embodiment as shown in FIG. 3b, with the difference that it is located on the other transverse side of the subframe 1 and may therefore also comprise a mirrored design.

Figure 3C:
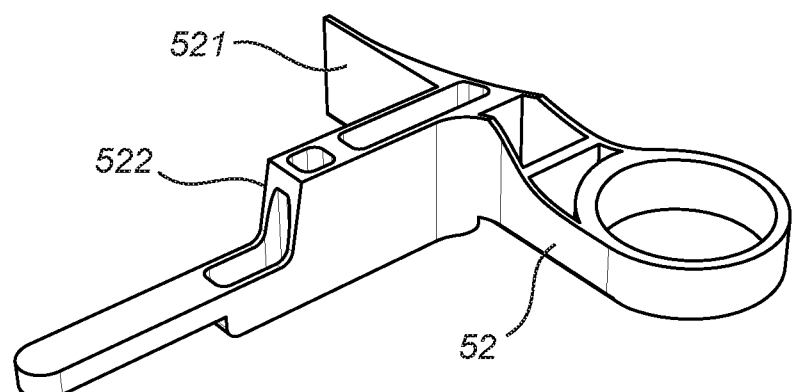

In FIG. 3c, the second node 52 as illustrated in FIG. 1 is depicted. As can be seen, the node 52 has been extruded, whereby the extrusion extends in the vertical direction z. Furthermore, the node 52 comprises a vertical wall denoted as 521 and 522, whereby the wall is L-shaped with a first wall 522 which extends in the longitudinal direction x and a second wall which extends in the transverse direction y. By this configuration it may be possible to accomplish a strong and reliable connection to the transverse rear member 4. The connection may be made by for example welding between the walls 521 and 522 and the transverse rear member 4. The first node 51 may of course be configured in a similar manner, although the orientation of the walls etc. may be different since it is located on the opposite side of the transverse rear member 4.

FIG. 3d shows the front connection member 91 as also depicted in FIG. 1, which in this example is a separate member. As can be seen, the member 91 is an extruded profile where the extrusion extends in the longitudinal direction x. As mentioned above, this member 91, together with the other corresponding member 92, may for example be used for connecting the subframe 1 to a front absorbent impact system (not shown), such as a lower load path full speed crash and pedestrian protection. Such an impact system may for example be designed to be replaced for collisions up to about 16 km/h, whilst the subframe 1 is intact up to such low speeds and only deforms at higher speeds. In an example embodiment, the front absorbent impact system may also comprise extruded parts.

FIG. 3e shows a more detailed view of the second console 82, or linkarm, as shown in FIG. 1. The console 82 is in this embodiment made of three separate components, i.e. 821, 822 and 823, which all three are extruded parts, whereby the extrusion of the part 821 extends in the longitudinal extension x, the extrusion of the part 822 extends in the vertical extension and the extrusion of the third part 823 extends in the transverse direction y. By connecting the three respective parts, a strong and rigid linkarm may be accomplished for connecting the longitudinal member 22 to the transverse rear member 4. The three parts may for example be connected by welding. Moreover, in this embodiment, it can be seen that the three parts are made as open parts, i.e. not as hollow parts.

FIG. 3f shows the transverse rear member 4 from FIG. 1. The member 4 is an extruded part, wherein the extrusion extends in the transverse direction y. The member 4 comprises an integrated trigger 43, which has been made in the extrusion operation, and further the member 4 comprises a number of connection points 44 and 45 for connecting the member 4 to other vehicle components, such as an electrical propulsion motor, steering gear etc. (not shown). The member 4 is further designed such that it presents end sections 41 and 42, see also FIG. 1, suitable for connecting the member 4 to the first and second nodes 51 and 52.

FIG. 3g shows the fourth node 62 from FIG. 1. As can be seen, the node is extruded and the extrusion extends in the longitudinal direction x. The node 62 further comprises four connection points 621 for connecting the subframe 1 to another vehicle component. By extruding the node 62 in the longitudinal direction x, an increased surface area for connecting the node to the transverse front member 3 may be accomplished. This surface area may be connected to the transverse front member 3 by welding, wherein the weld seam will be long enough for accomplishing a strong and reliable connection. The third node 61 may be configured in a similar manner, except for that the node 61 is located on the other transverse side of the subframe 1.

FIG. 3h shows a detailed view of the members 101 and 102 as depicted in FIG. 1. The members 101 and 102 may for example be used for X & X, Y reference hole consoles, for aligning the subframe 1 to a vehicle body (not shown). As can be seen, the members 101 and 102 are extruded parts wherein the extrusion extends in the vertical direction z.

Figure 4:
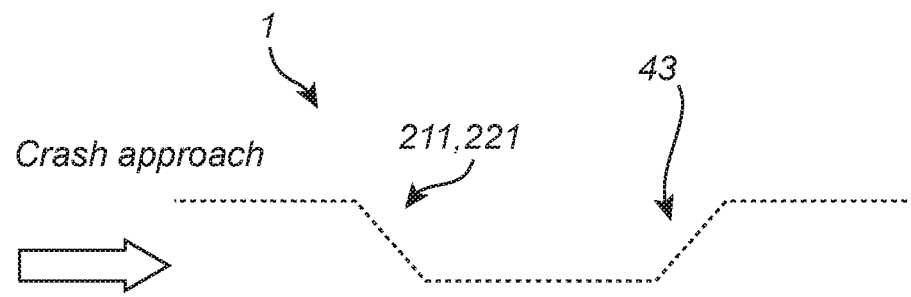
FIG. 4 shows a principal drawing of how a subframe according to an example embodiment of the present invention may fold during a collision.

In FIG. 4, a principal view of a subframe 1 according to an example embodiment of the present invention is depicted, where it can be seen how the subframe 1 will deform during a high impact collision. The subframe 1 will deform downwardly at a first section where the triggers 211 and 221 are located and at another section located further down the subframe 1 where the trigger 43 is located. As can be seen, the subframe 1 will deform such that it attains substantially a U-shape. It has been realized that it is advantageous if the subframe 1 attains substantially a U-shape during a high impact collision. The subframe 1 according to the present invention will therefore deform in a controlled manner during a high impact collision and into a shape which will lead to a high safety for the occupants in the vehicle. More particularly, by attaining a U-shape, components/parts located above the subframe 1, such as an electric propulsion motor and steering gear, may due to the folding not stack up with each other creating high intrusion and VPI (vehicle pulse index).

Steering gear which is fitted behind the engine on the subframe 1 in x direction will fold down with the subframe's 1 U-shape, where one main purpose for the U-shape in this area is to get the steering gear down, giving space for engine to move inwards in respect of the vehicle. By doing this, the subframe 1 and the rest of the front structure of the vehicle may bend and absorb unobstructed high energy from stack up clashes and perform at safety top level. Hence, stacking up of the components/parts in the front engine compartment of the vehicle may be avoided or reduced. Thereby, the risk of components/parts moving into a vehicle occupant compartment during a high impact collision may be reduced. Additionally, by the specific folding pattern, a desired vehicle pulse index may be obtained. An important aspect of the subframe 1 during deformation thereof is that by its design and configuration it may not break or be detached, but only deform into the expected U-shape.

Figure 5:
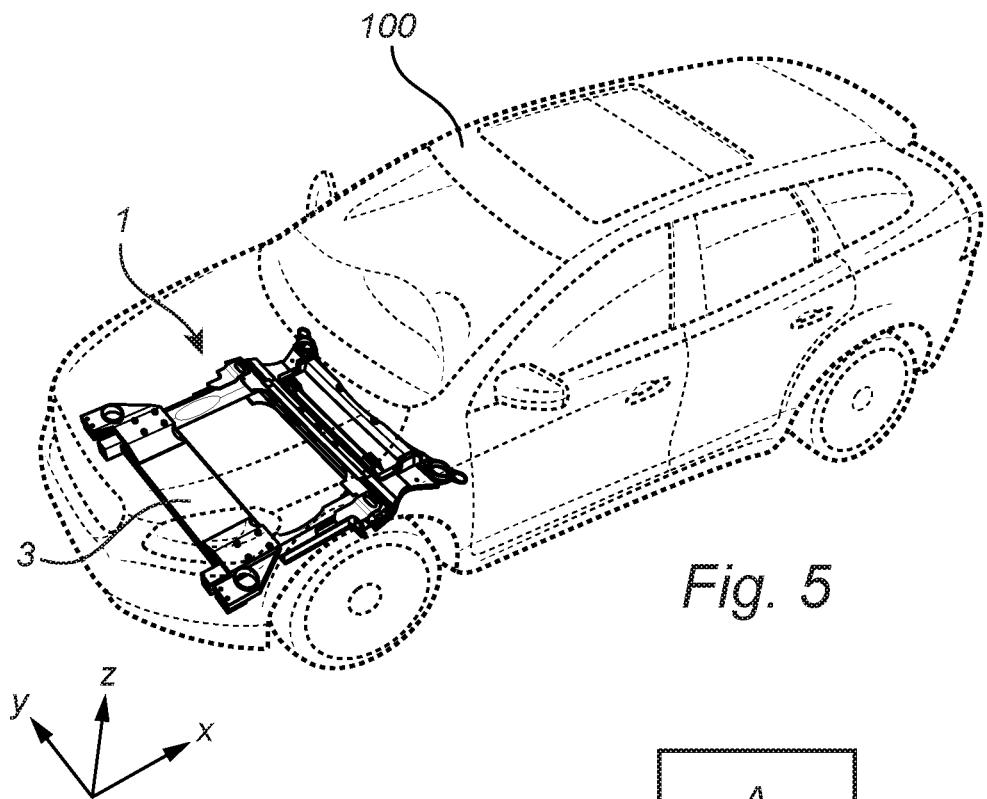
FIG. 5 shows a vehicle according to an example embodiment of the present invention.

FIG. 5 shows an example embodiment of a vehicle 100 according to the present invention, wherein the vehicle 100 comprises a subframe 1 according to the present invention. Preferably, the vehicle 100 is a pure electrical car or a hybrid electric car. As can be seen, the subframe 1 is mounted at the front section of the vehicle 100. The subframe is preferably mounted to the vehicle body (not shown). As can be further seen, the pole absorbing member 3 has been integrated into the subframe 1 in an advantageous way, i.e. it is located in the front section of the subframe 1, and also in the front section of the vehicle 100.

Figure 6:
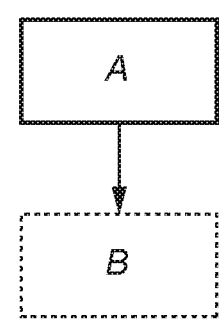
FIG. 6 shows a method according to an example embodiment of the present invention.

FIG. 6 shows a flowchart of a method according to an example embodiment of the present invention. In step A, the transverse front member 3, the transverse rear member 4 and the first and second longitudinal members 21 and 22, respectively, are extruded in its respective directions. Furthermore, the first, second, third and fourth nodes 51, 52, 61 and 62, respectively, are also extruded. Step B comprises an optional step, indicated by the dashed line, whereby the members are connected together by at least one connection operation, preferably by welding, such as high strength laser/hybrid welding, metal inert gas (MIG) welding or friction stir welding (FSW). By the provision of the method as disclosed herein, a cost-efficient process with high scalability and flexibility may be obtained.

The invention is not limited to the embodiments described herein. It would be evident for the skilled person that other embodiments and modifications to the embodiments specified hereinabove are also possible within the scope of the claims.

The invention claimed is:

1. A subframe for a vehicle, comprising,
a first and second longitudinal member, said longitudinal members extending in a longitudinal direction (x) and being relatively offset in a transverse direction (y) of the subframe,
a transverse front member directly connectable to and between the first and second longitudinal member at a front section of the subframe,
a transverse rear member directly connectable to the first and second longitudinal member at a rear section of the subframe, wherein said transverse front member and transverse rear member being relatively offset in the longitudinal direction (x) of the subframe, and
a plurality of connection points located on the transverse rear member between a first node and a second node located at opposite transverse ends of the transverse rear member and a plurality of connection points located on a third node and a fourth node located at opposite transverse ends of the transverse front member and adapted to connect one or more of a motor, a steering component, and a suspension component directly to the subframe,
wherein the respective first and second longitudinal member and the respective transverse front and rear member are extruded profiles, whereby the extrusion of each respective longitudinal member extends substantially in the longitudinal direction (x) and the extrusion of each respective transverse front and rear member extends substantially in the transverse direction (y), and
wherein said first node and said second node are extruded profiles.

2. The subframe according to claim 1, whereby the extrusion of the first and second respective node extends in a substantially vertical direction (z) of the subframe.

3. The subframe according to claim 1, wherein said third node and said fourth node are extruded profiles.

4. The subframe according to claim 3, whereby the extrusion of the third and fourth respective node extends in the substantially longitudinal direction (x) or in a substantially vertical direction (z) of the subframe.

5. The subframe according to claim 1, wherein the transverse front member is configured as a pole absorbing member for absorbing longitudinal shock loads, said pole absorbing member comprising at least one inner vertical wall extending in the transverse direction (y).

6. The subframe according to claim 1, wherein at least one of the first and second node comprises a vertical wall extending in at least one of the longitudinal (x) and transverse (y) direction, wherein said vertical wall is configured for being connectable to the transverse rear member.

7. The subframe according to claim 6, wherein the vertical wall extends in the transverse (y) and in the longitudinal (x) direction, wherein said vertical wall forms an essentially L-shaped profile which is connectable to and configured for enclosing a corner section of the transverse rear member.

8. The subframe according to claim 1, wherein at least one of the first and second longitudinal member and the transverse rear member comprises at least one trigger configured for folding the subframe during a collision.

9. The subframe according to claim 8, wherein the at least one trigger is located on an upper section of at least one of the first and second longitudinal member and the transverse rear member.

10. The subframe according to claim 8, wherein at least one trigger is located on an upper side of the transverse rear member and extends in the transverse direction (y).

11. The subframe according to claim 10, wherein the at least one trigger located on the upper side of the transverse rear member is an integrated portion thereof being formed by the extrusion process of the transverse rear member.

12. The subframe according to claim 8, wherein the at least one trigger is configured as an indentation.

13. The subframe according to claim 1, wherein at least one of the extruded profiles is made of metal or metal alloy.

14. A vehicle, comprising:
a subframe, comprising,
- a first and second longitudinal member, said longitudinal members extending in a longitudinal direction (x) and being relatively offset in a transverse direction (y) of the subframe,
- a transverse front member directly connectable to and between the first and second longitudinal member at a front section of the subframe,
- a transverse rear member directly connectable to the first and second longitudinal member at a rear section of the subframe, wherein said transverse front member and transverse rear member being relatively offset in the longitudinal direction (x) of the subframe, and
- a plurality of connection points located on the transverse rear member between a first node and a second node located at opposite transverse ends of the transverse rear member and a plurality of connection points located on a third node and a fourth node located at opposite transverse ends of the transverse front member and adapted to connect one or more of a motor, a steering component, and a suspension component directly to the subframe,
- wherein the respective first and second longitudinal member and the respective transverse front and rear member are extruded profiles, whereby the extrusion of each respective longitudinal member extends substantially in the longitudinal direction (x) and the extrusion of each respective transverse front and rear member extends substantially in the transverse direction (y), and
- wherein said first node and said second node are extruded profiles.

15. A method for providing a subframe for a vehicle, comprising,
- extruding a first and second longitudinal member, said longitudinal members extending in a longitudinal direction (x) and being relatively offset in a transverse direction (y) of the subframe,
- extruding a transverse front member and directly connecting the transverse front member to and between the first and second longitudinal member at a front section of the subframe,
- extruding a transverse rear member and directly connecting the transverse rear member to the first and second longitudinal member at a rear section of the subframe, wherein said transverse front member and transverse rear member being relatively offset in the longitudinal direction (x) of the subframe, and
- providing a plurality of connection points located on the transverse rear member between a first node and a second node located at opposite transverse ends of the transverse rear member and a plurality of connection points located on a third node and a fourth node located at opposite transverse ends of the transverse front member and adapted to connect one or more of a motor, a steering component, and a suspension component directly to the subframe,
- wherein the extrusion of each respective longitudinal member extends substantially in the longitudinal direction (x) and the extrusion of each respective transverse front and rear member extends substantially in the transverse direction (y), and
- wherein said first node and said second node are extruded profiles.

16. The method according to claim 15, whereby the extrusion of the first and second respective node extends in a substantially vertical direction (z) of the subframe.

17. The method according to claim 15, wherein said third node and said fourth node are extruded profiles.

18. The method according to claim 17, whereby the extrusion of the third and fourth respective node extends in the substantially longitudinal direction (x) or in a substantially vertical direction (z) of the subframe.

* * * * *